United States Patent [19]
Yamamoto et al.

[11] 3,862,290
[45] Jan. 21, 1975

[54] METHOD FOR SHAPING CELL PROTEIN

[75] Inventors: Atsushi Yamamoto; Hiroshi Teranishi; Tadayasu Furukawa; Takashi Matsuki, all of Tokyo, Japan

[73] Assignee: Kyowa Hakko Kogyo Co., Ltd., Tokyo, Japan

[22] Filed: Nov. 10, 1972

[21] Appl. No.: 305,272

Related U.S. Application Data

[62] Division of Ser. No. 107,462, Jan. 18, 1971, abandoned.

[30] Foreign Application Priority Data

Feb. 2, 1970 Japan................................. 45-8440

[52] U.S. Cl............. 264/202, 260/112 R, 426/204, 426/364
[51] Int. Cl.............................................. D01f 9/04
[58] Field of Search................. 260/112 R; 264/202; 106/124; 99/1, 9, 14, 17; 195/3, 28; 426/204, 364

[56] References Cited
UNITED STATES PATENTS

| | | | |
|---|---|---|---|
| 2,603,630 | 7/1952 | Aries | 260/112 R |
| 3,121,665 | 2/1964 | Parfenfier | 260/112 R |
| 3,468,669 | 9/1969 | Boyer et al. | 99/17 |
| 3,493,386 | 2/1970 | Pyne | 99/17 |
| 3,585,179 | 6/1971 | Samejima et al. | 260/112 |
| 3,607,293 | 9/1971 | Furukawa et al. | 99/1 |
| 3,620,775 | 11/1971 | Cohly et al. | 264/202 |
| 3,645,746 | 2/1972 | Akinson | 99/17 |
| 3,662,671 | 5/1972 | Frederiksen et al. | 99/17 |
| 3,662,672 | 5/1972 | Hoer | 99/17 |
| 3,681,093 | 8/1972 | Tsuzuki et al. | 264/202 |

FOREIGN PATENTS OR APPLICATIONS 1,041,815  9/1966  Great Britain ................. 260/112 R

OTHER PUBLICATIONS

Lab. Manual of Anal. Method of Protein Chemistry, 1960, Alexander et al., Vol. 1, Pergmon Press, pg. 9–13 and 33–58.
Biophysical Chemistry, Edsall et al., Vol. 1, Academic Press, 1958, pp. 264 and 275–277.

*Primary Examiner*—Jay H. Woo
*Attorney, Agent, or Firm*—Fitzpatrick, Cella, Harper & Scinto

[57] ABSTRACT

A method for shaping cell protein for use in food processing which involves dissolving or dispersing protein obtained from said cell bodies at a pH which is more alkaline than the isoelectric point of the protein, contacting the resulting solution with a coagulating agent and adjusting the pH of the resulting coagulum.

11 Claims, No Drawings

METHOD FOR SHAPING CELL PROTEIN

This is a division of application Ser. No. 107,462, filed Jan. 18, 1971, and now abandoned.

This invention relates to a method of shaping microorganism cell protein. More specifically, this invention relates to a method of shaping microorganism cell protein for use in food processing.

With the recent and projected great increases in world population, it is an accepted fact that a worldwide food crisis is a distinct possibility. The food shortage is, in essence, a protein shortage. Numerous efforts have been and are being made to alleviate this shortage, e.g., increased production and species improvement of agriculture, marine and livestock products. Also, the development of new protein sources has been pursued and it is felt by experts that this approach may offer the best solution to this serious problem.

Microorganism cell bodies have been recognized as a promising protein source for the future, not only because of their high protein content and high nutritional value but also because of their high production efficiency and simplicity of production control. A particularly and significant development has been the rapidly developing technology in the area of the conversion of hydrocarbonassimilable yeasts to animal feed. However, although the cell bodies of these yeast microorganisms contain an abundant protein source having a good nutritional value, they generally have tough cell walls and therefore are poor in digestability and furthermore have a peculiar and undersirable taste and smell. Accordingly, it is very difficult to use these cell bodies directly as a food source for human beings. To overcome the disadvantages possessed by these yeast cell bodies and yet still make use of their excellent protein source it is desirable to extract and separate the protein component. However, present attempts to achieve this extraction have not been completely successful since the cell bodies of the microorganisms have rigid cell walls requiring quite severe conditions to perform the extraction. The extracted protein is considerably denatured and is degraded to lower molecules. When protein so extracted is further admixed with alkali to form a dispersion or a solution and then contacted with an acidic solution in order to form a coagulum the resulting shaped protein has poor elasticity and is very brittle. Accordingly, said shaped materials are not always satisfactory for further food processing. Although protein foods can be served in a solid, liquid, powdery or the like form, in most cases the extracted protein is utilized in a shaped form having a definite texture.

Based on the above, various studies have been made on methods for shaping protein extracted from cell bodies to place it in a desirable form for food processing. As a result, the present inventors have found a method for shaping cell protein having suitable physical properties for food processing. This method involves dispersing or dissolving the protein extracted from the microorganism cell bodies at a pH which is more alkaline than the isoelectric point of the protein to obtain a dope and then contacting said dope with an aqueous solution of a salt such as $Na_2SO_4$, $K_2SO_4$, $MgSO_4$, $CaCl_2$, etc. to effect coagulation, and finally adjusting the pH of the thus obtained shaped materials to about 3–7.

Although the extracted cell protein of any microorganism can be utilized in the method of this invention, yeast cell protein is preferred because of its availability and relatively low cost.

The protein utilized in the present invention can be obtained by extraction and separation from the cell bodies by any one or a combination of well-known methods. For example, the protein can be separated from the cell body by mechanical treatment such as ultrasonic, attrition, pressing, or the like; enzymatic treatment utilizing a bacteriolytic enzyme; or chemical treatment utilizing an acid, alkali, salt or the like. The extracted protein is dispersed or dissolved to a 10-30% concentration in an aqueous medium at a pH which is more alkaline than (i.e., above) the isoelectric point of the protein preferably at a pH of 7 to 13.5, thereby resulting in the formation of a solution for producing shaped materials. The resulting solution is then contacted with a coagulating agent, preferably an aqueous sodium sulfate solution, to form a coagulated shaped material.

If desired, the coagulated protein can be shaped into fibers by extruding said protein solution into the coagulating bath through a nozzle having the desired number of openings, each of suitable diameter. High concentrations of the coagulating agent in the coagulating bath generally give more efficient coagulation. Shaped materials having desirable tensile strength and elongation can be obtained at a pH range of 6–10, preferably at a pH of about 7. The use of larger amounts of acid gives less favorable results. A suitable bath temperature is about 30°–50°C.

Prolonging the contact time between the solidified protein and the coagulating agent contributes to an increase in the tensile strength of the shaped article, and the tensile strength after coagulation can be increased by up to about ten-fold by aging the shaped materials in the coagulating bath for a few hours. That is to say, by varying the contact time, the tensile strength of the shaped materials can be adjusted as desired. The coagulated, shaped protein can be stretched, wound up on a bobbin without stretching, or simply filtered off, as desired.

The resulting shaped protein is slightly alkaline and somewhat soluble in cold water and almost completely soluble in hot water at 100°C. However, its water solubility can be significantly reduced by contacting it with an aqueous solution having a pH in the range of 3 to 7, preferably a pH of 4 to 5. This solution may, for example, be a buffer solution such as phosphate buffer, sulfate buffer, etc. or a solution of a suitable acid such as phosphoric acid, sulfuric acid, hydrochloric acid, etc. When conditioned to a pH of 4–5, the shaped protein materials are only slightly soluble in hot water at 100°C. Thus, the degree of water solubility can be controlled by adjusting and varying the pH. It is possible to carry out the coagulation step and the insolubilization step simultaneously by adjusting the pH of the coagulating bath to about 3–7. However, the tensile strength of the resulting shaped materials is then considerably lowered. Therefore, it is preferred to carry out the two steps separately when a shaped protein having a high tensile strength and low water solubility is desired.

When the insolubilization is carried out at a pH below 6, the protein materials are preferably reconditioned to a pH of 6 to 7 to be approximated to natural foods.

It is, as explained above, possible to achieve a wide variety of physical characteristics in the shaped materials of the present invention, by properly controlling the aging time after the coagulation and the pH adjustment. Thus, it is possible to produce products whose consistency, appearance and response to chewing closely approximate natural foods.

Now, the present invention will be explained more in detail, referring to the following examples.

EXAMPLE 1

To 10 kg. of living cell bodies of hydrocarbonassimilable yeast, Candida lipolytica (water content: 75 percent, total nitrogen content: 2.50 percent) were added water and caustic soda to form a solution of 20 l. with a caustic soda concentration of 0.5N. The solution was stirred at 50°C. for 2 hours and then adjusted to a pH of 7.5 with 6N hydrochloric acid. An extract solution was obtained by removing the residual solids and adding 3N hydrochloric acid dropwise to the extract solution to adjust the pH to 4.0. The solution was allowed to stand overnight at 5°C. and the precipitated protein was separated to give 650 g. of freeze-dried powder. The powder was analyzed and found to contain 4.8 percent water and 73.2 percent protein (total nitrogen content times 6.25). A quantity of 25 parts by weight of the powder was then dispersed in 75 parts by weight 1.6 percent caustic soda solution. The resulting solution (having a pH of 10.5 and a viscosity of 220 poises) was extruded from a nozzle having 50 openings each of 0.2 mm. diameter at a rate of 5 ml./min. into a 30 percent aqueous sodium sulfate solution at a temperature of 35°C. to produce a fibrous coagulum. About 50 pieces of the resulting fibers were filtered from the solution and cut to equal lengths. Tensile strength and percent elongation at break were measured on a tensile testing machine. These fibers had a strength of 350 g. per gram of wet fibers and stretched to 2.20 times their original length before breaking. When some of the fibers were immersed in hot water at 100°C. for a period of ten minutes they substantially completely dissolved. The remaining fibers were immersed in a 1M sodium acetatehydrochloric acid buffer solution at a pH of 4.0 for 90 seconds, then recovered and tested as described above. These fibers had a strength of 780 g. per gram of wet fibers and an elongation of 3.15 times their original length. They were also only about 2 percent soluble when immersed in hot water at 100°C. After the thus obtained fibers were washed with water, they had no objectionable taste or smell and had a desirable meat-like consistency when chewed.

EXAMPLE 2

To 10 kg. of living cell bodies of hydrocarbonassimilable yeast, Torulopsis famata (water content: 78 percent total nitrogen content: 2.11 percent) were added water and caustic soda to form a solution of 20 l. with a caustic soda concentration of 0.4N. The solution was stirred at 40°C. for 40 minutes, and 530 g. of protein powder containing 3.6 percent water and 76.2 percent protein were obtained according to the procedure of Example 1. This protein was dispersed in 1.8 percent aqueous caustic soda at a 20 percent concentration, and the resulting solution (having a pH of 11.0 and a viscosity of 195 poises) was extruded into an aqueous sodium sulfate solution at a rate of 5 ml./min. at 23°C., to produce a fibrous coagulum. The tensile strength and elongation of the fibers were measured in the same manner as in Example 1 and the fibers had a strength of 535 g. and an elongation of 3.26. When the fibers were immersed for 30 minutes in a 25 percent aqueous sodium sulfate solution at 30°C., the fibers had a strength of 920 g. and an elongation of 3.38. When these fibers were then further washed with water and adjusted to a pH of 4.50 by immersion in a pH 4.5 hydrochloric acid bath, the fibers had a strength of 1055 g. and an elongation of 3.32. The final fibers had no solubility in hot water and were rendered tasteless and odorless through water washing. They also had a desirable meat-like consistency when chewed.

EXAMPLE 3

To 5 kg. of living cell bodies of hydrocarbonassimilable yeast, *Candida lipolytica* (water content: 75 percent; total nitrogen content: 2.50 percent) were added water, sodium chloride, and caustic soda to form a suspension of 15 l. with a pH of 9.5 and a sodium chloride concentration of 0.3M/l. The suspension was subjected to a pressure of 500 kg./cm$^2$ with a Manton-Gaulin homogenizer and a sufficient amount of 10N caustic soda was added to readjust the pH to 9.5, and an extraction was carried out at a temperature of 40°C. for two hours. The pH of the extract solution obtained by centrifugal separation was adjusted to 4.0 with hydrochloric acid, and the resulting solution was allowed to stand overnight at 5°C. The precipitated protein was separated to give 280 g. of a freeze-dried powder containing 3.6 percent water and 85.3 percent protein. A liquid dispersion was then prepared in the same manner as in Example 1, and contacted with a 20 percent aqueous sodium sulfate solution at 30°C. to produce a coagulum. The coagulum was filtered, immersed in water and adjusted to a pH of 5.0 with dilute hydrochloric acid. After 30 minutes the coagulum was filtered, and washed with water. The resulting shaped protein had a meat-like mastication property and was tasteless and odorless.

What we claim is:

1. A process for producing yeast cell protein fibers which are substantially water-insoluble and which have a texture suitable for shaping into a food, which process comprises spinning a first aqueous solution of yeast cell protein into a second aqueous sodium sulfate coagulating solution to form yeast cell protein fibers and contacting the protein fibers with an aqueous solution having a pH of 4 to 5, wherein (1) said aqueous solution of yeast cell protein has a pH which is more alkaline than the isoelectric point of said protein and is from 7 to 13.5 and wherein (2) said aqueous sodium sulfate coagulating solution has a pH of 6 to 10 and contains a sufficient amount of sodium sulfate to coagulate the protein and form said fibers.

2. The process of claim 1 wherein said aqueous solution of yeast cell protein is an aqueous 10–30 percent yeast cell protein solution.

3. The process of claim 1 wherein the concentration of sodium sulfate in said second aqueous sodium sulfate coagulating solution is from 20 to 30 weight per cent.

4. The process of claim 1 wherein the pH of said coagulating solution is about 7.

5. The process of claim 4 wherein the temperature of said coagulating solution is from 30° to 50°C.

6. The process of claim 1 wherein said fibers are aged in said coagulating solution for a few hours to increase the tensile strength of said fibers, prior to contacting said fibers with said aqueous solution having a pH of 4 to 5.

7. The process of claim 6 wherein said contacting of said fibers with said aqueous solution having a pH of 4 to 5 is a separate step conducted after said fibers are removed from the coagulating solution.

8. The process of claim 1 wherein said aqueous solution having a pH of 4 to 5 comprises an aqueous buffer solution.

9. The process of claim 1 wherein said aqueous solution having a pH of 4 to 5 comprises an aqueous solution of an acid.

10. A process for producing yeast cell protein fibers which are substantially water-insoluble and which have a texture suitable for shaping into a food, which process comprises:

A. forming a spinning solution which consists essentially of an aqueous solution containing from 10 to 30 weight per cent of said yeast cell protein and having a pH which is (1) more alkaline than the isoelectric point of said protein, and (2) from 7 to 13.5;

B. spinning said spinning solution into a coagulating bath which has a pH of 6 to 10 and which consists essentially of an aqueous sodium sulfate solution containing a sufficient amount of sodium sulfate to coagulate said protein and form said fibers; and C. thereafter contacting said fibers with a separate aqueous solution having a pH of 4 to 5.

11. The process of claim 10 wherein the concentration of sodium sulfate in said coagulating bath is from 20 to 30 per cent by weight.

* * * * *